April 25, 1950  J. E. BRANDENBERGER  2,505,603
PROCESS FOR THE MOLDING IN THEIR OWN PACKING OF
FUSIBLE OR THERMOPLASTIC PRODUCTS
Filed July 15, 1947  3 Sheets-Sheet 1
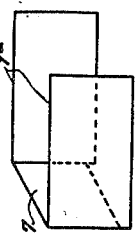
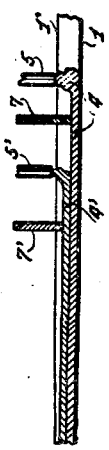
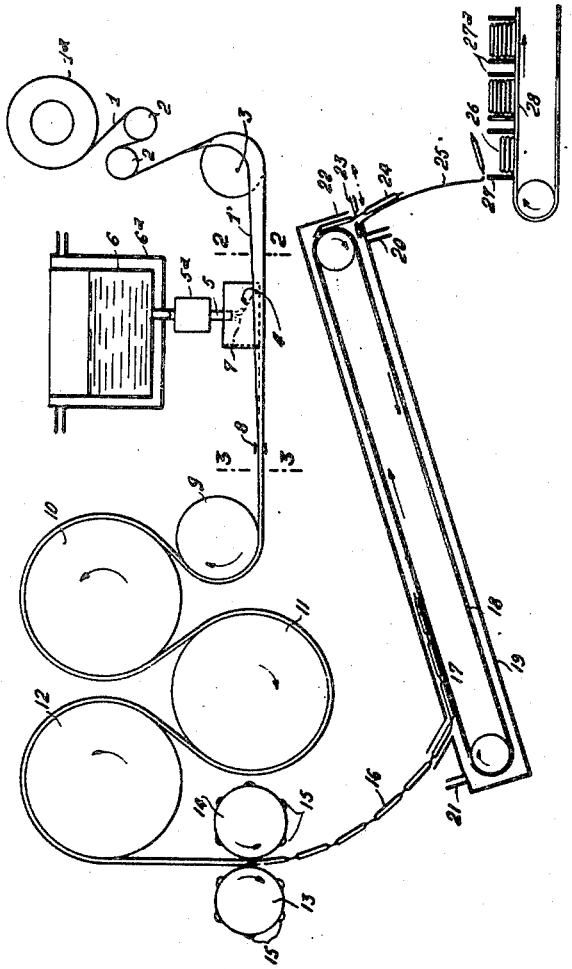
INVENTOR
JACQUES EDWIN BRANDENBERGER
BY Wm. S. Pritchard
ATTORNEY.

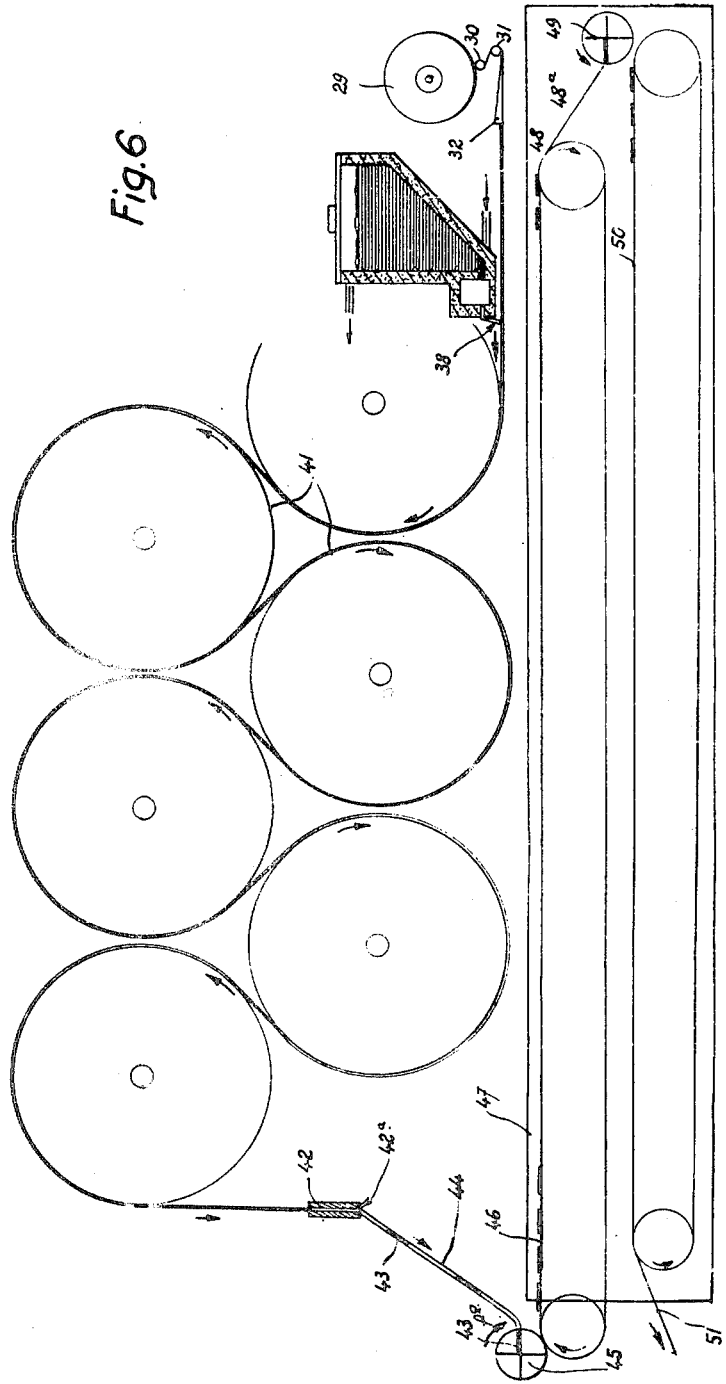

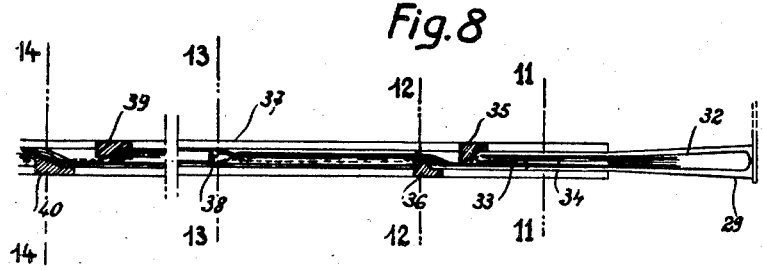
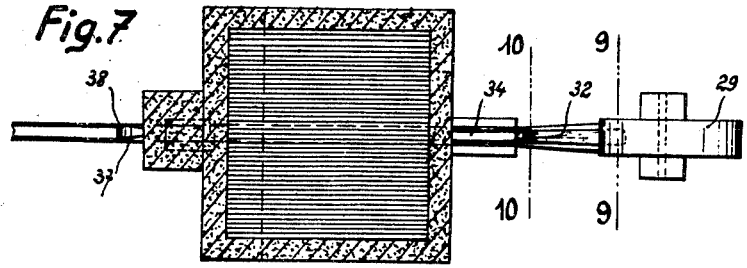
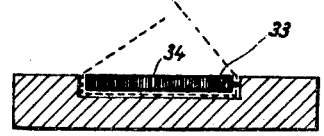
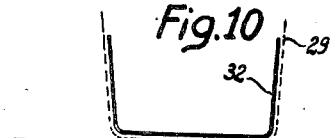
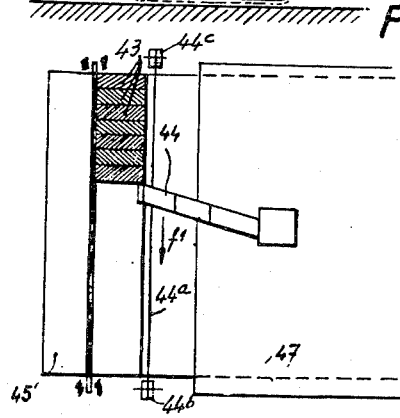
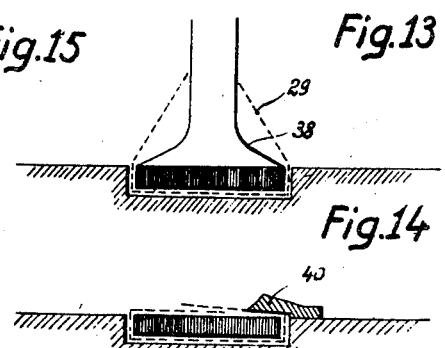
INVENTOR
JACQUES EDWIN BRANDENBERGER
BY
ATTORNEY Patented Apr. 25, 1950

2,505,603

UNITED STATES PATENT OFFICE 2,505,603

PROCESS FOR THE MOLDING IN THEIR OWN PACKING OF FUSIBLE OR THERMOPLASTIC PRODUCTS

Jacques Edwin Brandenberger, Paris, France, assignor to La Cellophane, a Swiss company Application July 15, 1947, Serial No. 760,952
In France July 16, 1946

4 Claims. (Cl. 99—171)

The present invention has for its object an improved process for the casting and moulding in their own packing of fusible or thermo-plastic products, hardening when cold, such for example, as mixtures of cocoa and sugar constituting chocolate, confectionery products, fatty substances, and the like.

The process according to the invention is characterised in particular by consisting in the continuous unwinding of a thin endless band of packing material, transparent or otherwise (thin skin of regenerated cellulose, parchment paper, metal foil, or their combinations, and the like), raising the edges of this skin in such manner as to form a trough, pouring the hot materials to be packed, into this trough, folding over the two edges of the band one over the other, and flattening the roll thus formed and then cooling it in such manner as to ensure the setting or hardening of the packed product which is then cut into sections of the desired length.

According to another feature, before or in the course of cooling, the flat roll formed is pressed into transversely at intervals in such manner as to bring into contact the two longitudinal edges of the packing and then after the complete setting of the moulded and packed products, the separate cakes formed are divided by cutting through the packing at the successive points where the roll has been pressed.

The invention has also for its object a machine intended for the application of the said process and characterised in particular by comprising, in combination, means for continuously unwinding a band of packing material, means for making a trough of this, one or more devices for the pouring of one or more products into this trough, means for flattening the edges of the band on to the poured product or products and a device for cooling the roll formed.

In the case of the separation into tablets, the machine comprises in addition, two rollers or similar devices provided with projections, and between which the formed roll passes.

Other features and advantages will appear from the following description:

On the annexed drawing given simply by way of example,

Fig. 1 is a diagram of a machine according to the invention.

Fig. 2 is a cross-section on the line 2—2 of Fig. 1 showing the trough formed by the endless band, the longitudinal edges of which are raised.

Fig. 3 is a cross-section on the line 3—3 of Fig. 1 and shows the roll when flattened.

Fig. 4 is a view in perspective of a scraper intended to regulate or standardise the upper face of the moulded liquid or pasty layer.

Fig. 5 is a partial view of a modification in which two products are poured one on the other, for example, first chocolate and then a cream.

Fig. 6 represents another modification of the machine.

Fig. 7 is a partial plan view on a larger scale, of the inlet end of this machine.

Fig. 8 is a plan view on the same scale of the longitudinal folding device for the packing skin.

Figs. 9 to 14 are cross-sections on the lines 9—9 to 14—14 of Figs. 7 and 8.

Fig. 15 is a plan view of the device taking the small slabs after cutting.

According to the embodiment represented by Fig. 1, band, for example of a film or skin of regenerated cellulose 1, unwinds continuously from a feed bobbin 1ª passing over guide rollers 2. The latter carry it over a device 3 of known type which raises its longitudinal edges 1' forming a U-profile or the like, as shown by Fig. 2, in such manner that the band 1 forms on leaving this device an actual trough. In the interior of this trough the liquid or pasty product is deposited hot at 4, it being delivered in a suitable quantity through a nozzle or delivery tube 5 of a supply device 5ª, mounted on a reservoir 6. This reservoir contains the liquid to be packed, kept by heat at a suitable degree of viscosity. The said reservoir comprises for example a double wall 6ª through which a heating fluid runs or it is provided with electrical means of heating.

A scraper 7 preferably provided with lateral walls 7ª (Fig. 4) intended to prevent the excess of material touching the longitudinal raised edges 1' of the band 1, regulates the upper face and consequently the thickness of the poured liquid layer.

Means are provided at 8 by which the two lateral edges 1' of the skin are folded over the surfaces of the product in such manner that the latter is thereafter completely enveloped, as is represented in section on Fig. 3. The liquid sheet or roll flattened in this way is carried over a series of rollers 9, 10, 11, 12, having smoothed cooled rims which congeal the liquid. These rollers may be provided with edges or flanges in such manner as to cool the lateral faces of the roll formed. The rollers are arranged in such manner that their inner common tangents traversed by the sheet to be cooled, are as short as possible in order to avoid deformation of this sheet.

On leaving the last roller 12, the band of packed liquid which has become semi-solid, is engaged between two drums 13—14 rotating oppositely in the direction of the arrows. These drums are provided with projections 15 which, coming almost in contact in pairs, squeeze the sheet or roll while still plastic at intervals in such manner that on leaving these rollers there is obtained a continuous string 16 of thick tablets of material separated by a thin part constituted simply by the two opposite faces of the packing skin which has come into contact and adhere together. The adhesion may furthermore be accentuated by shaping the surface of the projections 15 of the rollers 13, 14 so as to produce a goffering of the two faces of the skin which have come into contact. The string 16 thus formed is then carried at 17 on to an endless belt 18 arranged in a closed space 19, is there energetically cooled by a fluid entering at 20 and emerging at 21, in such manner that on leaving, at 22, the tablets are sufficiently hardened and indeformable. A cutting device 23 of any known type, having a reciprocating movement suitably synchronised with the movement of the conveyor 18, separates the tablets 24 which fall down a chute 25 to pile up at 26 in the interior of boxes 27. These boxes, for example of cardboard, are preferably brought automatically by a transverse conveyor on which they are deposited by a mechanism which can manufacture them directly from a continuous band of cardboard. The filled boxes 27ª pass on to an endless belt 28 having an interrupted movement, which leads them to a point, not shown, for their packing. This latter operation may itself be automatic.

Fig. 5 shows a modification in which there is poured successively, into the trough 1, a first product through a nozzle 5 and, after the scraper 7 has regulated the upper face of the layer formed, there is poured through a second nozzle 5', another liquid product more or less viscous, such as a cream, the second layer thus formed has its surface smoothed by a second scraper 7'.

Naturally, when the whole of the trough thus filled passes into the device 8 intended to fold the two longitudinal edges of the band 1 over each other, the two layers of products 4 and 4' more or less intermingle and experience shows that, in fact, the lower layer practically coats in a complete manner the product 4' spread on this layer, there can thus be obtained filled products.

It is quite evident that the rollers 13 and 14, intended to form the tablets or small slabs can be arranged at any other suitable place provided that at the point where these rollers are placed, the packed substance is sufficiently plastic. These rollers could, for example, be placed immediately after the device 8 intended to form the flat roll. In this case, the cooling cylinders would have to comprise a rim of polygonal shape, possibly hollowed out with recesses each one of which would take, as in a mould, one of the successive tablets formed by the said rollers 13 and 14.

Figs. 6 to 15 represent another embodiment of the invention.

According to this modification, the packing skin 29, after having left guide rollers 30 and 31, comes under a metal plate 32 the profile of which varies progressively from a flat or plain shape passing through curved shapes (Fig. 9) to terminate progressively at the trough profile of Fig. 10. The extremity of the metal part 32 engages in a channel 33 (Figs. 8, 11) in which it continues in the form of a flat strip 34, the thickness of which is approximately equal to that of the slabs of packed material which it is desired to make.

The skin 29 shown dotted thus assumes the form of a trough, the two raised edges of which will be folded over successively by folders 35 and 36 (Figs. 8, 12) which thus impart, before filling, the final form which the packed products are to have, as appears from Fig. 12. At the point 37 is arranged the tube 38 delivering the product to be packed; its shape (Fig. 13) is such that the edges of the skin 29 can remain partially folded back. The nozzle or tuyère 38 has an outlet orifice the profile of which corresponds to that which it is desired to give to the small slabs of packed material, which, due to the folds preliminarily marked on the skin, permits of obtaining a perfect shape. The complete folding over of the band is carried out by a folder 39 for one edge, and by the folder 40 for the second edge.

The continuous band of packed product then passes over cooled rollers 41 (Fig. 6) arranged as in the first example and on leaving these rollers it passes through a device 42 formed of two shells which separate and approach each other at a suitably calculated rhythm, thus effecting by pressure the approach at a definite width, of the two faces of the skin, in such manner as to constitute the intervals separating the small slabs. The two shells are provided at their lower part with a suitable cutting device 42ª in such manner that on the closing together of these two shells, the small slab 43 which has just emerged, is cut at the centre of a separation. This slab drops on to an inclined gutter 44 which deposits it on to one of the blades of a revolving stand 45 having an axis perpendicular to the vertical longitudinal plane of the machine. The gutter or channel 44, the upper extremity of which is fixed, is arranged in such manner that its lower extremity can be shifted laterally by successive impulses after each cut by an amount a little larger than the width of a tablet. The lateral displacements of the lower extremity of the gutter or channel 44 are ensured automatically by successive impulses, first in the direction of the arrow $f^1$ and then in the reverse direction, by means of successive tractive efforts exerted on the said extremity of the revolving table parallel to the axis of the said table, by any known means, for example by an endless chain 44ª passing over pinions 44ᵇ and 44ᶜ driven in intermittent rotation first in one direction and then in the other.

There are thus arranged side by side on each blade of the revolving table a certain number of tablets. When the blade of the revolving table is filled over the whole of its width, this table carries out by means of an intermittent driving mechanism of any known type, a quarter of a turn in the direction of the arrow $f^2$ (Fig. 6) which has for effect to deposit automatically on an endless belt 46 (Fig. 6) the tablets arranged in rows on the horizontal blade of the revolving table.

During this time, the following blade has taken the place of the first one and is being filled up in its turn with small slabs by a reverse movement of the inclined gutter or channel which returns progressively to the rear.

This device appreciably increases the efficiency of the endless belt 46 passing through the refrigerating chamber 47, for in the case of Fig. 1 it could only convey a single file of tablets. This belt is extended at its extremity 48 by a fixed inclined plane 48ª which deposits a transverse row of tablets on to another revolving table 49 having for its object to deposit them onto a fresh endless belt 50 at the end of which the tablets completely hardened slide on to a last inclined plane 51 which carries them to the boxing station.

It will be understood that with a very reduced length and volume of the refrigerating chamber it is possible by means of the device described to obtain a very high output of tablets of unexceptionable shape.

Naturally, the invention is in no way restricted to the methods of embodiment shown and described which have only been selected by way of example.

In the first example, the cylinders 9 to 12 may be located in a refrigerated enclosure.

The cylinder cooling devices may naturally be replaced by any other supporting and cooling surfaces. In any case, it is advantageous for these cooling devices to be arranged in such manner that the roll or sheet formed comes into contact with these devices successively by one face and then by the other in such manner as to obtain a complete cooling through the whole mass.

Having now described my invention what I claim as new and desire to secure by Letters Patent is:

1. A food casting and wrapping process, comprising advancing a continuous strip of flexible wrapping material endwise, while progressively folding it into trough shape to form a mould, pouring into said mould a thermoplastic food product selected from the group consisting of confectionery products and fatty substances in liquid easily flowable state, folding the sides of the trough-shaped strip in overlapping relationship over the deposited food product to form a continuous mould tube having the food product therein, cooling the food product in said tube to a plastic state, squeezing said tube at spaced points to displace and press aside the plastic material and bring the opposite sides of said tube into contact, and forming thereby a series of successive interlinked packages, and cooling said packages to harden the food product therein into a rigid state.

2. In a food casting and wrapping process as described in claim 1 the additional step of severing said tube at the squeezed sections thereof, to form individual separate packages.

3. A food casting and wrapping process, comprising advancing a continuous strip of flexible wrapping material endwise, while progressively folding it into trough shape to form a mould, pouring into said mould a thermoplastic food product selected from the group consisting of confectionery products and fatty substances in liquid easily flowable state, folding the sides of the trough-shaped strip in overlapping relationship over the deposited food product to form a continuous mould tube having the food product therein, cooling the food product in said tube to a plastic state, squeezing said tube at spaced points to displace and press aside the plastic material and bring the opposite sides of said wrapper into contact, forming thereby a series of successive interlinked packages, causing the contacting surfaces of said tube to adhere together, and cooling said packages to harden the food product therein into a rigid state.

4. A food casting and wrapping process, comprising advancing a continuous strip of flexible wrapping material endwise, while progressively folding it into trough shape to form a mould, pouring into said mould a thermoplastic food product selected from the group consisting of confectionery products and fatty substances in liquid easily flowable state, folding the sides of the trough-shaped strip in overlapping relationship over the deposited food product to form a continuous mould tube having the food product therein, cooling the food product in said tube to a plastic state, squeezing said tube at spaced points to displace and press aside the plastic material and bring the opposite sides of said tube into contact, forming thereby a series of successive interlinked packages, goffering the contacting surfaces of said tube to cause them to adhere together, and cooling said packages to harden the food product therein into a rigid state.

JACQUES EDWIN BRANDENBERGER.

REFERENCES CITED

The following references are of record in the file of this patent:

UNITED STATES PATENTS

| Number | Name | Date |
|---|---|---|
| 1,413,064 | Salfisberg | Apr. 18, 1922 |
| 1,719,635 | Trauger et al. | July 2, 1929 |
| 1,810,740 | Vogt | June 16, 1931 |
| 2,062,279 | Vogt | Nov. 24, 1936 |
| 2,134,862 | Dunnam | Nov. 1, 1938 |
| 2,156,328 | Barbieri | May 2, 1939 |
| 2,180,966 | Salfisberg | Nov. 21, 1939 |
| 2,194,451 | Soubier | Mar. 19, 1940 |
| 2,340,260 | Clunan | Jan. 25, 1944 |
| 2,384,492 | Rebechini | Sept. 11, 1945 |